United States Patent [19]
Payne

[11] Patent Number: 5,305,413
[45] Date of Patent: Apr. 19, 1994

[54] OPTICAL FIBRE FEEDTHROUGH

[75] Inventor: Roger A. Payne, Felixstowe, England

[73] Assignee: BT & D Technologies Limited, Suffolk, United Kingdom

[21] Appl. No.: 924,076

[22] PCT Filed: Mar. 28, 1991

[86] PCT No.: PCT/GB91/00479
§ 371 Date: Sep. 21, 1992
§ 102(e) Date: Sep. 21, 1992

[87] PCT Pub. No.: WO91/14958
PCT Pub. Date: Oct. 3, 1991

[30] Foreign Application Priority Data
Mar. 29, 1990 [GB] United Kingdom ............... 9007019

[51] Int. Cl.⁵ ................................................ G02B 6/10
[52] U.S. Cl. ..................................... 385/128; 385/84; 385/138
[58] Field of Search ............... 385/123, 126, 127, 128, 385/78, 84, 88, 138

[56] References Cited

U.S. PATENT DOCUMENTS

| | | | |
|---|---|---|---|
| 4,407,561 | 10/1983 | Wysocki et al. | 385/128 |
| 4,418,984 | 12/1983 | Wysocki et al. | 385/128 |
| 4,504,113 | 3/1985 | Baak | 385/128 |
| 4,610,506 | 9/1986 | Tokunaga et al. | 385/128 |
| 4,708,429 | 11/1987 | Clark et al. | 385/91 |
| 4,818,047 | 4/1989 | Takuma et al. | 385/128 |
| 4,904,052 | 2/1990 | Rand et al. | 385/128 |
| 4,997,260 | 3/1991 | Honjo et al. | 385/128 |
| 5,074,643 | 12/1991 | Petisce | 385/128 |

FOREIGN PATENT DOCUMENTS

| | | |
|---|---|---|
| 0266780 | 5/1988 | European Pat. Off. |
| 3615727 | 11/1987 | Fed. Rep. of Germany |
| 88/04437 | 6/1988 | PCT Int'l Appl. |
| 90/02351 | 3/1990 | PCT Int'l Appl. |

OTHER PUBLICATIONS

Chu et al., *Journal of Lightwave Technology*, vol. LT-2, No. 5, Oct., 1984, pp. 650–662.
*Patent Abstracts of Japan*, vol. 12, No. 194, Jun. 7, 1988, and JP A 62299918 (Nippon Telegr. & Teleph. Corp.) Dec. 26, 1987.

*Primary Examiner*—Frank Gonzalez
*Attorney, Agent, or Firm*—Nixon & Vanderhye

[57] ABSTRACT

An optical fibre feedthrough in which a polarization maintaining (PM) fibre is sealed within a metallic sleeve by a glass seal. The seal applies asymmetric stresses to the fibre which is orientated so that they reinforce its PM properties. This arrangement reduces the manufacturing tolerances needed to avoid destroying the PM properties of the fibre associated with symmetric stress seals. It has application to packages for opto-electronic components. A double optical fibre feedthrough is also disclosed.

10 Claims, 3 Drawing Sheets

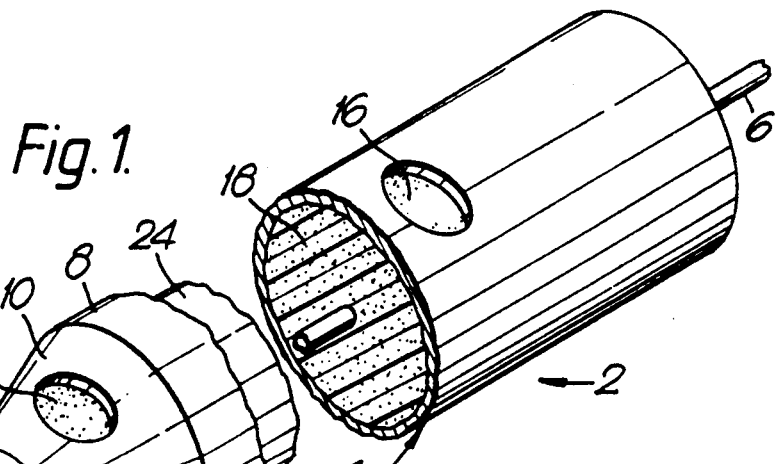
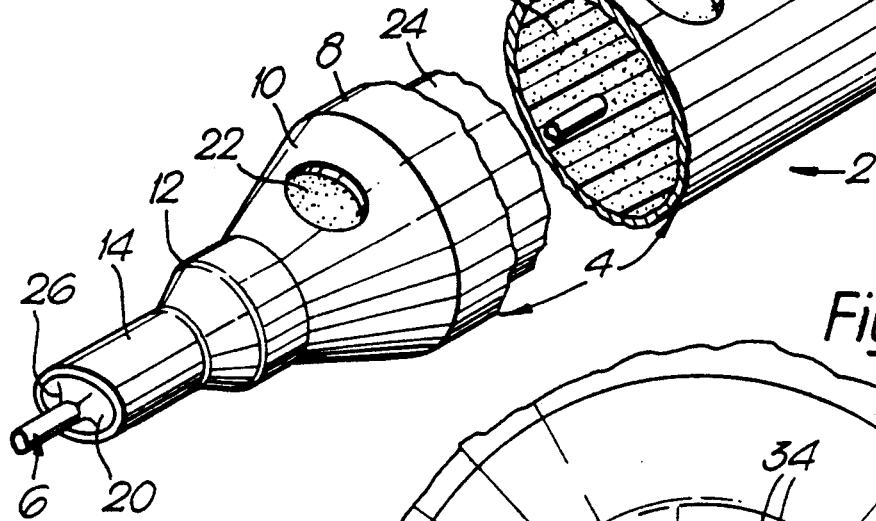
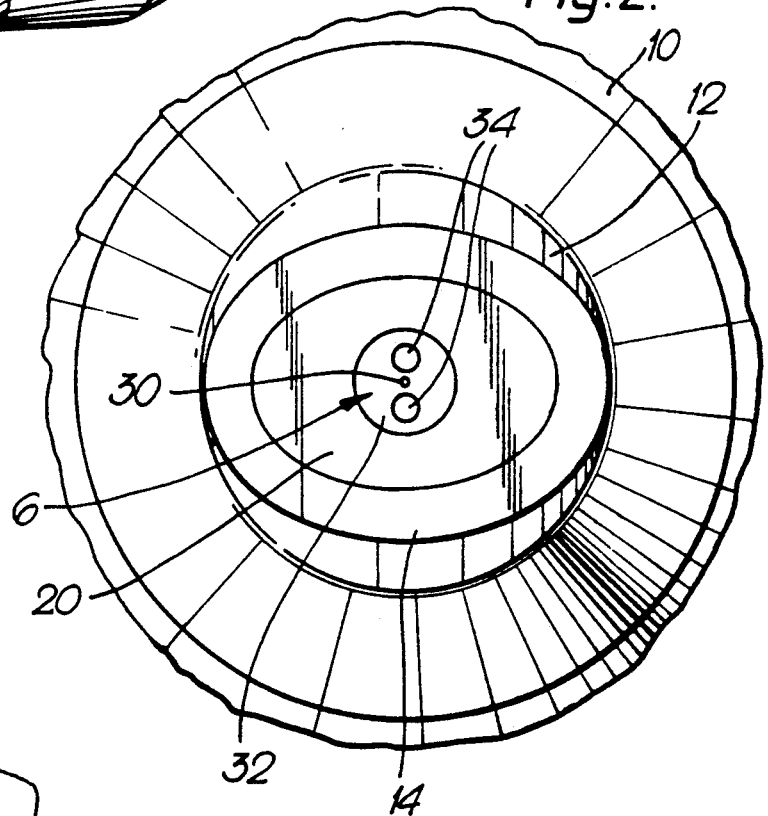
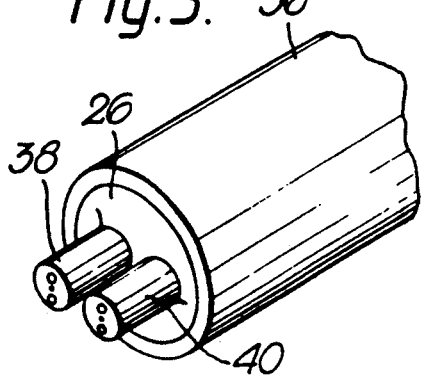

OPTICAL FIBRE FEEDTHROUGH

BACKGROUND OF THE INVENTION

1. Field of the Invention

This invention relates to optical fibre feedthroughs.

2. Related Art

A device package that incorporates an optical or opto-electronic component has an aperture for a feedthrough feeding one or more optical fibres that conduct light to or from inside of the package. One approach is to seal the optical fibres hermetically within a metallic sleeve with glass solder, which sleeve is, in turn, mounted in the aperture.

Generally 'single mode' optical fibre supports two orthogonally polarized $He_{11}$ modes. Because of the near-degeneracy of the propagation constants $B_x$ and $B_y$, for the x and y axes respectively, any small perturbations along the length of the fibre lifts this degeneracy and thus the state of polarization (SOP) will evolve unpredictably. Any linearly polarized light injected into the fibre will thus become elliptically polarized after a short distance.

Many applications, e.g. lithium niobate components and coherent optical transmission systems, require a stable SOP output from the fibre. One solution is to use High Birefringence Polarization Maintaining (HB-PM) fibre.

PM fibres maintain the state of polarization by introducing a large intrinsic birefringence arising from asymmetry in the core or stress effects due to the fibre cladding. The latter of the two methods includes, for example, the formation of high stress regions by means of circular rods along the length of the fibre either side of the core. When launched into one or other of the principal modes, light will propagate unchanged along the length of the fibre provided no external perturbations exceed the internal intrinsic stresses, otherwise the SOP will be unpredictable. When using circular profile tubes it is imperative that the fibre is concentric within the tube, that the tube wall thickness is uniform and that no air bubbles or contaminants interfere with the glass seal. Any significant deviation from a symmetrical structure, both longitudinally and axially, will destroy the symmetry of the stresses external to the fibre and could therefore act to destroy the fibres PM properties. Keeping the symmetry accurate to such an extent can pose difficult problems if large-quantity production is envisaged.

BRIEF SUMMARY OF THE INVENTION

The present invention provides an optical fibre feedthrough assembly comprising a metallic sleeve, at least one polarization maintaining fibre, and a glass seal completely surrounding the or each fibre and sealing the or each fibre to the sleeve, the seal applying asymmetric stresses to the or each fibre, and the or each fibre being orientated so that the stresses act to reinforce the polarization maintaining properties of that fibre.

Because the feedthrough is designed to apply stresses to the fibre via the glass seal reinforcing the polarization maintaining properties of the fibre, small manufacturing deviations from the ideal will not result in a net stress to the fibre acting to destroy its polarization maintaining properties.

The asymmetric stresses can be achieved by use of a metallic sleeve having an asymmetric inner cross-section. These may be made by metal injection moulding due to the difficulty of machining a metallic sleeve with an asymmetric inner cross-section to have a circular external profile. 304L and 316L stainless steels are expected to be suitable materials for such moulding. In this case the outer cross-section is preferably circular to simplify fixing within the aperture of the device package. Alternatively rod elements can be introduced into an otherwise circularly symmetric seal to provide the required asymmetric stresses. These rod elements could be standard, bare, single-mode fibres, for example.

BRIEF DESCRIPTION OF THE DRAWINGS

Embodiments of the invention and a method of manufacturing them will now be described, by way of example only, with reference to the accompanying drawings of which:

FIG. 1 is perspective, part cut-away, view of a metallic sleeve suitable for the present invention;

FIG. 2 is a cross-sectional view of a polarization maintaining fibre sealed within the sleeve of FIG. 2;

FIG. 3 is a perspective view of the end of a fibre feedthrough according to the present invention having a pair of polarization maintaining fibres sealed within it.

DETAILED DESCRIPTION OF EXEMPLARY EMBODIMENTS

Figure 4:
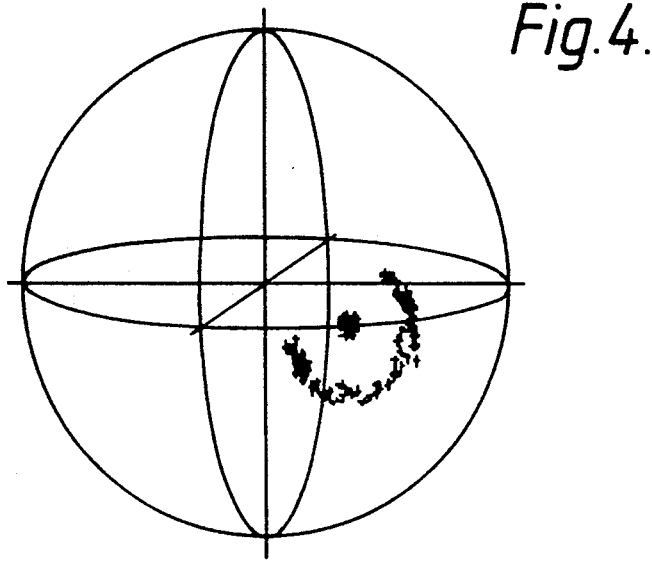
FIGS. 4 and 5 are graphical representations of the output state of polarization plotted on a Poincare sphere for a fibre feedthrough metal sleeve having a variable wall thickness and uniform wall thickness, respectively.

Referring to FIG. 1, a feedthrough assembly 2 comprises a metallic sleeve 4 through which is threaded a polarization maintaining (PM) optical fibre 6. The sleeve 4 has a tubular section 8, a frusto-conical section 10 providing a taper to a second tubular section 12 flattened at its end to produce an elliptical cross-sectioned section 14. The PM fibre 6 terminates about 0.5 mm beyond the narrow end of section 14 of the sleeve 8.

The section 8 has a throughhole 16 through which epoxy glue 18 is injected to hold the fibre 6 in place after the termination end of the fibre 6 is sealed by means of glass solder 20 fed into the sleeve 4 via an aperture 22 in the tapered section 10.

The fibre 6 has its outer protective coatings stripped, and if needed, the end formed into a lens before it is threaded into a spacer 24 of brass, silica glass or other suitable material. The fibre 6 and spacer 24 are then threaded into the sleeve 4 so that the spacer 24 abuts the tapered section 10 for positive location and the end of the fibre 6 protrudes the desired distance from the elliptical end section 14. The spacer 24 supports the fibre 6 centrally within the sleeve 4 at the front sections (10, 12, 14). The sleeve 4 is heated by small electric coils wound round ceramic tubes (not shown) into which the feedthrough assembly is placed. The front sleeve sections 10, 12 and 14 are heated by one heater coil, the tubular section 8 being heated by a second to give background heat to the larger diameter portion 8. Glass solder is heated to its flow temperature and introduced into the sleeve 4 via the aperture 22 until the front sections 10, 12 and 14 are filled, generally by capillary action. Enough is introduced to produce an even meniscus 26 around the protruding section of the fibre 6 which has the effect of centering the fibre 6 within the tube section 14.

Alternative methods of forming the seal may be employed. Glass solder in the form of a preform can be threaded on to the fibre for subsequent heating, for example.

The section 14 is then viewed end-on to check that the fibre is centrally located and that the high stress regions are orientated to within 3° of short axis of the elliptical end-section 14. The glass solder is then allowed to cool slowly. Some glass withdraws into the tube section 14 on cooling. Sufficient solder should be introduced before cooling to ensure a meniscus remains after cooling. Finally, glue is fed in through throughhole 16 to fix the unsealed portion of fibre 6 within the tube 4 to relieve strain of the glass sealed portion of the fibre 6 during subsequent handling. The rear of the tube 4 may be crimped provided care is taken not to affect the fibre.

Various types of glass may be chosen for the glass solder. Generally it is desirable to use a solder which flows at a temperature to avoid fibre enbrittlement so one with a glass transition temperature in the range 400° C. to 480° C.

The most consistent results have been obtained using "OI" PP-200 Glass, expansion coefficient $125 \times 10^{-7}/°$C. Poisson's ratio 0.22 and glass transition temp 290° C. manufactured by Owens-Illinois Inc., USA. This company is apparently no longer trading but the glass is obtainable as a single billet from Garner Glass, 177, South Indian Hill Blvd., Claremount, Calif., USA.

Good fibre preparation is essential for achieving a satisfactory seal of the fibre 6 within the sleeve 4. The outer protective coating must be stripped off to expose the bare optical fibre with its reflective cladding. This is then cleared using a solvent, for example acetone, until all traces of the coating have been removed.

The feedthrough is then tested for hermeticity using helium, the seal being considered hermetic if the detected leak rate does not exceed $10^{-8}$ atmospheres cm$^3$s$^{-1}$ Helium, MIL SPEC 883.

The seal can be seen to consist of three coaxial cylinders with each differing properties: modulus of elasticity E, Poisson's ratio $\nu$, and coefficient of thermal expansion $\alpha c$. Due to the heat treatment required to flow the sealing glass the subsequent cooling will result in radial, $\sigma_\gamma$, circumferential (hoop), $\sigma_{100}$, and axial, $\sigma_z$, stresses being set up in the seal, these can be compressive or tensile in each of the three regions, independently. The resultant properties are dependent on the physical properties of the individual components and their physical size, giving a great many permutations. To obtain a hermetic seal these should be "largely compressive", although acceptable seals may be produced with slightly tensile hoop stress. A major benefit of having the glass capillary in compression is that the formation, and propagation, of cracks in the seal due to tensile stresses are reduced giving excellent long term hermetic properties.

The constitutive equations relating stress to strain for an elastic material, in polar coordinates, are:

$$\epsilon_\gamma = \epsilon_f + E^{-1}[\sigma_\gamma - \nu(\sigma_\phi + \sigma_z)] \tag{1}$$

$$\epsilon_\phi = \epsilon_f + E^{-1}[\sigma_\phi - \nu(\sigma_\gamma + \sigma_z)] \tag{2}$$

$$\epsilon_z = \epsilon_f + E^{-1}[\sigma_z - \nu(\sigma_r + \sigma_\phi)] \tag{3}$$

and the free strain, $\epsilon_f$, is given by, $$\epsilon_f = \alpha \Delta T$$

where $\alpha$ is the linear thermal expansion coefficient and $\Delta T$ is the temperature change.

By applying appropriate boundary conditions, and selecting known values for E, $\nu$ and $\epsilon_f$, it is possible to solve numerically for the three component stresses. This analysis is described in detail in the applicant's co-pending published application EP87310670 which is hereby incorporated by this reference. The above calculation will give results which should not be regarded as exact because it is assumed that the materials are elastic, whereas the hot glass capillary is actually viscoelastic.

Referring now to FIG. 2 there is shown the end view of the fibre feedthrough assembly 2 of FIG. 1 showing the orientation of the PM fibre 6 within the oval crosssectional tube section 14. The fibre is standard commercially available PM silica fibre having a core region 30 and a cladding 32 in which are located two stressing rods 34 one either side of the core 30.

The metal of tube 14, and glass are again chosen so that the forces acting on the glass seal 20 after formation are largely compressive.

The correct orientation of the high stress regions in relation to the tubes asymmetry was determined by trial and error, although a complicated stress analysis could be carried out based on work by P. L. Chu and R. A. Sammut, "Analytical method for calculation of stresses and material birefringence in polarization-maintaining optical fibre," J. Lightwave Technol., vol. LT-2, no. 5, Dp. 650–662. 1984. Two suggested trial orientations are to align the high stress regions of the PM fibre parallel to either of the natural axes of asymmetry.

Other structures may be used to obtain such asymmetric stresses, for example a feedthrough of circular internal cross-section with rod inserts either side of the fibre positioned on or at 90° to the high stress axis of the fibre, the position depending on the coefficient of expansion of the insert.

Referring now to FIG. 3 a sleeve of a fibre feedthrough assembly according to the present invention is as shown in FIG. 1 except that the termination end has a circular cross-section 36, which is the only part of the sleeve 4 shown. Sealed within the tube section 36 are two PM fibres 38 and 40. The non-circularly symmetric arrangement of the fibres 38 and 40 within the tube section 36 create asymmetric stresses within the glass seal 26. The PM fibres are arranged, again by use of a video camera, to align the high stress regions of the fibres 38 and 40.

The non-circularly symmetric arrangement of the fibres 38 and 40 within the tube section 36 create asymmetric stresses within the class seal 26 thus alleviating the need for an asymmetric tube profile. The fibres are mounted so that their stress regions are parallel (vertically in the orientation of the FIG. 3) thus aligning the fast and slow axes of each fibre to the other. Other alignments of the fibres, for example each fibre rotated through 90°, may also work.

Because two fibres have to fit inside the tube section 36, standard 900 $\mu$m coated fibre cannot be used: fibre with 250 μm diameter sleeving must be used instead. The same standard of preparation is required as for the single fibre assembly, but a steel spacer is fitted over one of the fibres to maintain a 250 μm centre spacing between the fibres at the rear of the tube section 36. PTFE sleeving is then slid over the double fibre tail to achieve the same dimensions as for the single 900 μm coated fibre. The protruding ends of the fibres are laid in accurately machined 'V' grooves to give a fibre centre-to-centre spacing of 250±2 μm. The high stress regions are aligned vertically, with the aid of a video camera, to within ±3°0 by rotating the fibres. When orientation and fibre protrusion are satisfactory the assembly is heated and molten glass applied through the hole at back of narrow tube section until it appears at the front to form a meniscus around both fibres described before with reference to FIGS. 1 and 2.

Testing of the assemblies was carried out by temperature modulating an 80 mm length of the fibre tail over a 20° C. range whilst monitoring the output SOP for light launched on one of the principal modes. The output SOP is plotted on a Poincare sphere, and for a perfect fibre (undegraded) will be on the equator. Any degradation will be shown as a circle describing the varying states of polarization. The larger the size of the circle the greater the degradation of the fibres properties. This can be related to the extinction ratio of the fibre (i.e. ratio of the power in the two modes) by 10 log[$\tan^2$ (z/4)] where z is the angle in degrees that the circle subtends at the centre of the sphere.

To give an extinction ratio of the fibre >25 dB requires a maximum z angle of the order of 13°. Because of measurement noise, the minimum circle that could be accurately measured is 2°. This corresponds to an extinction ratio of about 40 dB.

Figure 5:
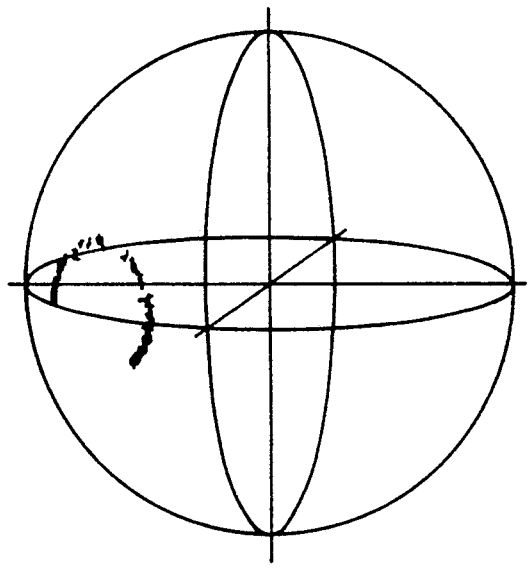
Figure 6:
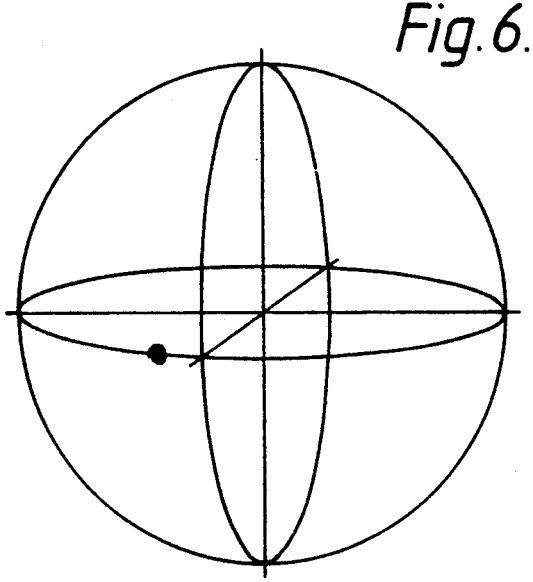
FIG. 6 is a graphical representation of the output state of polarization for a bare fibre plotted on a Poincare sphere.

Early results, for single fibre assemblies, using round tubes with poor uniform tube wall thickness and varying concentricity gave widely varying results from no degradation of the fibre to little or no extinction ratio. Asymmetric versions gave more predictable results with a more consistent extinction ratio between different feedthroughs (See FIG. 4), but if the fibre was a long way off centre or the tube wall thickness too variable, the degradation could still be significant (see FIG. 5). A bare fibre result is shown in FIG. 6 for comparison.

When the concentricity is strictly controlled with the round version and the glass seal forms a good meniscus a fibre feedthrough can be made keeping the extinction ratio within the specification of >25 dB. The ones that fail can usually be spotted during manufacture by poor centring of the fibre or a non-uniform glass seal. Assemblies that fail can be reheated and allowed to find an equilibrium state, more glass being added if necessary. These have been found to be within specification when retested. A potential problem with reheating is that the epoxy, used at the rear of the feedthrough to hold the outer sleeving, which can creep forward contaminating the glass seal.

The double fibre assemblies of the type shown in FIG. 3 have proved to be more consistent than the single fibre assemblies, and the only failure to date has been due to both fibres being held to near the top of the feedthrough. Aligning the double fibres to a lithium niobate wafer has shown the coupling to be within the insertion loss limits specified indicating the spacing to be within tolerance.

Transmission tests of the fibre tails showed no extra losses are introduced when sealed into a fibre feedthrough according to the present invention.

Laser welding of a bush, as normally done during fibre-package attachment, resulted in no further degradation of the fibres PM properties within the accuracy of the testing apparatus.

Figure 7:
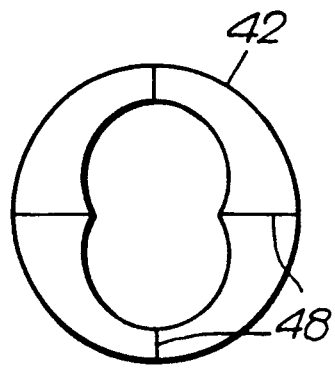
FIGS. 7 to 9 are end views of sleeves each having a circular outer cross-section and asymmetric inner cross-section.
Figure 8:
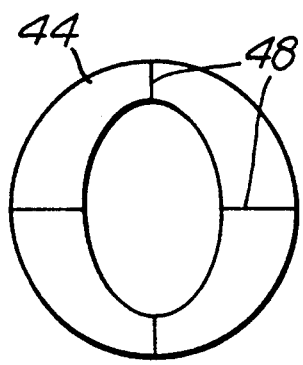
Figure 9:
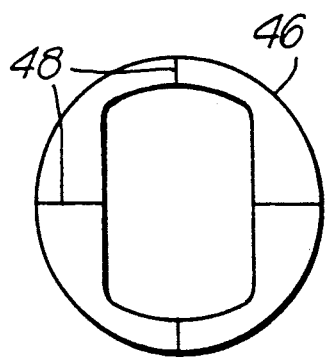

Referring now to FIGS. 7 to 9 there are shown examples of fibre feedthrough end sleeves 42, 44, and 46 respectively in which the asymmetry of their cross-section provides the required asymmetric stresses. These have the advantage of having circular outer cross-sections for ease of fixing to a bush before welding to the aperture in a device package. They may be made by metal injection moulding of stainless steel, for example.

Each end face 48 of the metal sleeves 42 and 46 has alignment markers 50 to aid visual alignment of the fibre stress axis to the planes of symmetry of the feedthrough 42, 44 and 46.

Figure 10:
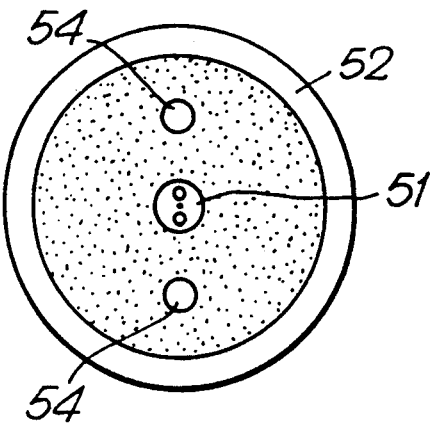
FIG. 10 is an end view of fibre feedthrough in which asymmetric seal stresses are induced by rod elements within the seal.

Referring now to FIG. 10, a further manner of obtaining asymmetric stresses to a PM fibre 51 in a feedthrough 52 of circular inner and outer cross-section is by the incorporation of rodlike elements 54 orientated parallel to the PM fibre 5. For example, the elements 54 may comprise bare standard, non-PM fibres.

I claim:

1. An optical fibre feedthrough assembly comprising:
   a metallic sleeve,
   at least one polarization maintaining fibre passing through said sleeve, and
   a glass seal completely surrounding the at least one fibre and sealing the at least one fibre to the sleeve,
   the seal applying asymmetric stresses to the at least one fibre, and
   the at least one fibre being orientated so that the stresses act to reinforce the polarization maintaining properties of that fibre.

2. An assembly as claimed in claim 1, in which the sleeve has an asymmetric inner cross-section in the region of the seal.

3. An assembly as claimed in claim 2, in which the axes of symmetry of the inner cross-section are marked on the end face of the sleeve.

4. An assembly as claimed in claim 2 in which the sleeve is formed from stainless steel.

5. An assembly as claimed in claim 1, in which the sleeve has a circular outer cross-section in the region of the seal.

6. An assembly as claimed in claim 1, in which there are two polarization maintaining fibres sealed within the seal.

7. An assembly as claimed in claim 6, in which the sleeve is a cylindrical tube of circular cross-section in the region of the seal.

8. An assembly as claimed in claim 1, in which there are a pair of rod elements sealed within the seal which extend parallel to, and on opposite sides of, said at least one polarization maintaining fibre.

9. A packaged device comprising a metal housing having an aperture and a fibre feedthrough assembly fixed within the aperture, said feedthrough assembly including:
   a metallic sleeve,
   at least one polarization maintaining fibre passing through said sleeve fibre, and
   a glass seal completely surrounding the at least one fibre and sealing the at least one fibre to the sleeve, the seal applying asymmetric stresses to the at least one fibre, and the at least one fibre being orientated so that the stress act to reinforce the polarization maintaining properties of that fibre.

10. A polarization maintaining (PM) fibre feedthrough assembly comprising:

a PM fibre passing through and hermetically sealed to a feedthrough sleeve and said PM fibre being subjected to asymmetric stresses within said feedthrough sleeve, said asymmetric stresses being oriented to reinforce to PM properties of the PM fibre.

* * * * *